United States Patent [19]

O'Connor

[11] Patent Number: 4,855,534

[45] Date of Patent: Aug. 8, 1989

[54] CABLE SHIELDING TAPE AND CABLES INCORPORATING SUCH TAPE

[75] Inventor: Lawrence J. O'Connor, Winnipeg, Canada

[73] Assignee: KT Technologies Inc., Bridgetown, Barbados

[21] Appl. No.: 157,218

[22] Filed: Feb. 18, 1988

[30] Foreign Application Priority Data

Jul. 29, 1987 [GB] United Kingdom ................. 8717954

[51] Int. Cl.⁴ ........................ H01B 7/34; H01B 13/10; B32B 3/04; B32B 7/00

[52] U.S. Cl. .......................................... 174/36; 156/54; 156/202; 174/107; 428/189; 428/209; 428/377

[58] Field of Search ......................... 174/36, 107, 108; 156/201, 202, 54; 428/377, 189, 209, 458, 418, 425.8, 432

[56] References Cited

U.S. PATENT DOCUMENTS

| | | | |
|---|---|---|---|
| 3,032,604 | 3/1959 | Timmons | 174/36 |
| 3,325,589 | 11/1965 | Mildner | 174/36 |
| 3,474,186 | 4/1967 | Hale | 174/107 |
| 3,692,063 | 9/1972 | Wagele | 174/107 X |
| 4,323,721 | 4/1982 | Kincaid et al. | 174/36 |
| 4,406,914 | 9/1983 | Kincaid | 174/36 X |
| 4,596,897 | 6/1986 | Gruhn | 174/36 |
| 4,621,777 | 11/1986 | O'Connor | 174/108 X |

FOREIGN PATENT DOCUMENTS

| | | | |
|---|---|---|---|
| 117813 | 9/1980 | Japan | 156/54 |

*Primary Examiner*—Morris H. Nimmo
*Attorney, Agent, or Firm*—Breneman & Georges

[57] ABSTRACT

A cable shielding tape is produced by laminating a single layer of an insulating material film which may be plastic to a conducting layer which may be of metallic foil with the conducting layer offset laterally with respect to said insulating layer, leaving an overhanging portion of the insulating layer along one edge of the tape and a similar overhanging portion of the conducting layer along the opposite edge of the tape. This overhanging portion is then folded over the edge of the insulating layer and bonded to the opposite surface thereof. In an alternative arrangement the conducting layer and insulating layer are coterminous at the opposite edge and both are folded back with the conducting layer outermost.

8 Claims, 2 Drawing Sheets

CABLE SHIELDING TAPE AND CABLES INCORPORATING SUCH TAPE

BACKGROUND OF THE INVENTION

This invention relates to a shielding tape for telecommunication cables and the like.

In the manufacture and application of cables for the transmission of high frequency signals, several parameters are highly important. Firstly, the conductor(s) transmitting the signal must be shielded to prevent signal loss by radiation, and also to prevent unwanted external radio frequency and electromagnetic interference from affecting the signals. It is also desirable that adjacent pairs of shielded conductors have such shields electrically insulated from each other to prevent "cross talk" between such adjoining pairs. Furthermore, such shielding must have an acceptable degree of flexibility to accommodate installation and working conditions, must not be excessively heavy or bulky, and must be economical to manufacture and incorporate into the cable. It is also desirable that the resistance of the shield be low enough to dissipate electrical currents impinging thereon, thus limiting the minimum thickness of the conducting layer which can be employed.

It is additionally desirable in certain applications that the shield exhibit circumferential continuity throughout its length, to eliminate the so-called "slot effect" caused by the insulating plastic layer bonded to the conducting layer at the overlap of the tape not allowing continuous circumferential contact of the metallic conductor layer at the overlap.

Prior art has employed a number of practices in attempting to meet the above conditions. The construction mainly used to attempt to meet these requirements is that known as Z-fold in which the above slit laminate has one edge folded back to expose the foil layer outermost and the other edge folded back in the opposite direction to expose the insulating layer outermost. Examples of this construction are shown in U.S. Pat. No. 4,621,777 of the present inventor and U.S. Pat. No. 3,032,604 (Timmons).

This product has been received favourably in the trade, but has a number of disadvantages. Firstly, the folding of the tape involves folding the laminate in its entirety including particularly the plastic insulating layer. This can exhibit springback resulting in an improperly shielded cable which would therefore have to be reworked, retaped or scrapped. In addition the extra thickness of plastic film adds unnecessary bulk and material to the tape.

The formation of tape and its winding into long length packages under current technology also necessarily involves splices in the tape along its length. These splices arise in the individual layers before lamination, and in the tape after lamination and present a significant problem at the folding process. It is essential that the folding process is entirely consistent without any faults since an improper fold will cause an improperly shielded tape. Faults in the folding process are particularly prone to develop at the splices and accordingly must be closely monitored. It will be applicable that the total cost of manufacture of the finished cable product is heavily dependent upon the scrap or reject rate and hence any improvement in the inconsistency of the wrapping process can lead to significant reduction in cost.

Examples of other tape construction are shown in U.S. Pat. Nos. 4,323,721 (Kincaid), 3,325,589 (Mildner), 3,474,186 (Hale) and 4,596,897 (Gruher). It is believed however that the disclosure of tapes in these patents is merely of a theoretical or simplified nature and the composite tapes apparently disclosed in these patents have been manufactured by laminating foil and plastic laminate to a plastic layer has been possible.

SUMMARY OF THE INVENTION

It is therefore an object of this invention to provide a tape which will provide continuous longitudinal and circumferential electrical continuity of the shield, together with isolation between adjacent pairs of conductors, the tape being formed from a single conducting layer and a single insulating layer allowing a reduction in the amount of material.

It is a further object of this invention to provide a tape which is supplied in a pre-folded form and lighter in weight and more easily formed in application to the cable.

According to a first aspect of the invention therefore there is provided a tape consisting of a single conducting layer and a single insulating layer, said conducting layer being laminated to one side of said insulating layer with one longitudinal edge of the conducting layer being spaced inwardly from the respective longitudinal edge of the insulating layer to form an edge free portion of the insulating layer which is free from said conducting layer, and the other longitudinal edge of the conducting layer overhanging the respective other edge of the insulating layer, being folded therearound and bonded to the other side of the insulating layer.

Preferably the tape is wound into a package in which the tape traverses axially of the package to form a package width greater than the width of the tape.

According to a further aspect of the invention, there is provided a cable including at least one conductor having the above tape wrapped therearound longitudinally so that the conducting layer is in continuous circumferential contact and the portion of the insulating layer which is free from foil being wrapped over the longitudinal joint.

The accompanying drawings represent and illustrate the referenced tape, and a cross section of one of several varieties of cable which can usefully and economically employ such tape.

In the drawings, parts not necessary to delineate the invention have been omitted for clarity, and dimensions have been exaggerated or minimized for the same reason.

DETAILED DESCRIPTION

Figure 1:
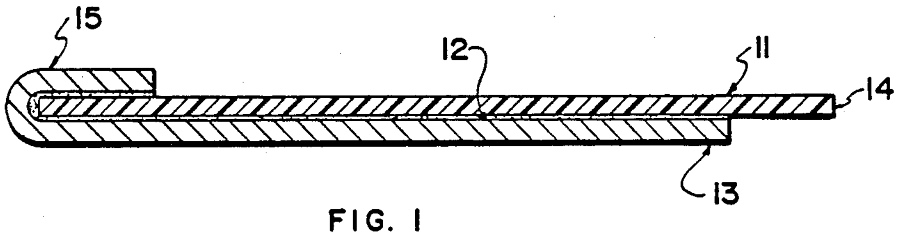
FIG. 1 is a cross sectional view of a first tape according to the invention.

Referring to FIG. 1, 11 represents an insulating film or layer which has been slit to a predetermined width, then laminated in an offset relationship to a conducting layer 13 by means of adhesive 12 which has previously been applied to either layer. Overhang 14 or free portion of the insulating layer provides longitudinal insulation between the conducting layer and any adjacent shielded pairs when the tape is wrapped around a set of conductors as described above.

Figure 2:
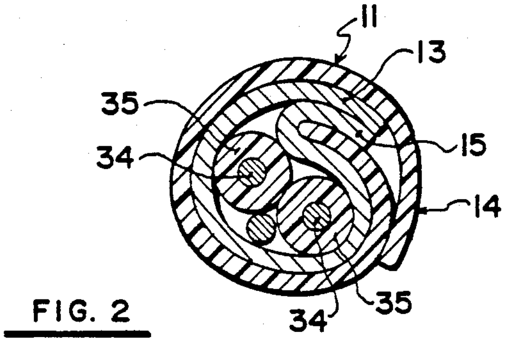
FIG. 2 is a cross sectional view of a typical telecommunication cable employing the tape of FIG. 1.

Referring now to FIG. 2, this represents a typical cross section of a set of pairs in a telecommunication cable in which conductors 34 are surrounded by insulation 35, around which is formed or wrapped the tape of FIG. 1, with conducting layer 13 inwardly. Adhesive layer 12 has been eliminated in this figure for purposes of clarity. It will be noted that overhang 14 of insulating layer 11 contacts said layer forming a insulating layer fully around the conductor assembly thus insulating this pair from adjacent pairs in the same cable. Conducting layer 13 contacts itself by way of folded-back overhang 15, thus establishing circumferential continuity of the shield and eliminating the "slot effect."

The tape according to the invention has the advantages relative to the conventional Z-fold tape that it is easier to handle in the unwinding and wrapping process and that it has a materials saving of up to 40%.

The package 23 is driven by a roller 24 and the tapes prior to winding are separated by a spacer bar 25 to leave narrow gaps between the rewound tapes, the gaps being substantially equal to the extent of the overhangs 14.

Figure 3:
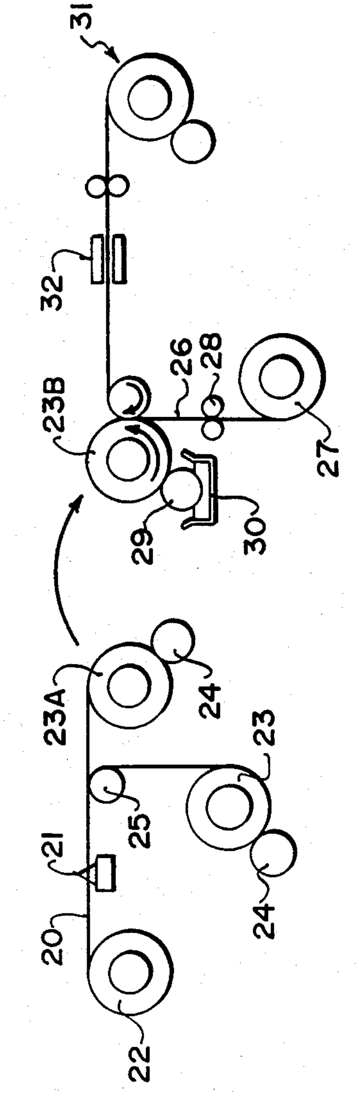
FIG. 3 is a side elevational view showing schematically a process for manufacture of the tape of FIG. 1.
Figure 4:
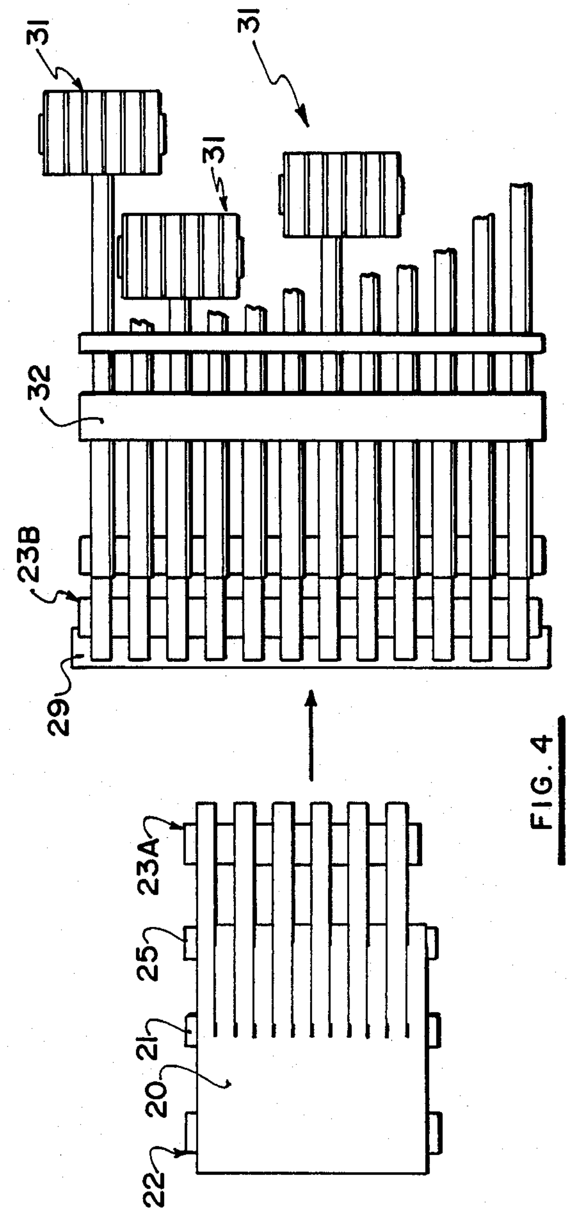
FIG. 4 is a top plan view of the process of FIG. 3.

The tape as shown in FIG. 1 is manufactured in a process as follows as shown in FIGS. 3 and 4. Firstly, a foil web 20 from a supply roll 22 is slit by slitters 21 into a plurality of separate tapes and rewound on two separate rolls 23 and 23A. The individual tapes of the web are taken alternately to the roll 23 and to the roll 23A so that each tape or the roll is spaced from the next by a distance equal to the width of the tape. The rolls 23 and 23A are deiven by rollers 24 and separation of the alternate tapes takes place at a splitter roll 25.

Each of the rewound packages in turn then forms a supply package 23B for a further processing system in which the foil tapes are laminated with insulating plastic layer tapes 26 supplied separately from a roll 27 through nip guide rollers 28. The rewound package is mounted on an unwind device so that the rewound package sits directly upon a gravure roller 29 or the like so that a suitable adhesive generally a holt melt is applied from a supply 30 directly to the tapes while they are still supported by the supply roll formed by the rewound package.

The plastic tapes are supplied from individual packages 27 previously formed in a separate process with the packages held in a supply section adjacent the supply roll of the foil. The plastic tapes are then brought into contact with the supply roll while the foil tapes remain supported by the supply roll and downstream of the adhesive applicator so the foil is directly laminated onto the plastic tapes while still supported and is then carried by the plastic tapes from the supply roll towards a packaging section 31. Prior to the packaging section, the overhanging portion of the foil is folded around the edge of the plastic tape by air jet folding devices 32 to form the construction shown in FIG. 1 by an air folding shoe or the like.

Thus, for the first time the foil tapes are handled without a supporting plastic web in a technique which enables them to be directly attached to a plastic tape layer in the offset manner shown in FIG. 1 so that the tape can consist of solely a single foil layer and a single plastic layer.

Folding of the edge of the foil around the edge of the plastic can be obtained very simply for example by air jet folding since the foil edge is very soft and is susceptible to bending.

The tape so formed is then wound into a package in which the tape traverses along the length of the package as it is wrapped around the package.

The tape is intended for shielding of cables for the transmission of high frequency signals. In such cables the conductor or conductors have generally a size of the order of 22, 24 or 26 AWG which is of course is significantly different from that of power cables. In order to cover such transmission cables, the width of the tape, that is the effective width of the foil known as the "foil width" of the tape will generally lie in the range 0.25 to 2 inches. As the conducting foil layer is not intended to carry any significant current, it is of a very thin nature and generally in the range 0.00025 to 0.004 inches. The thickness of the plastic insulating layer is generally selected in dependence upon a required mechanical strength for the tape. The thickness of the insulating plastic layer will therefore generally lie in the range 0.00048 to 0.003 inches with the latter being an extreme case.

The width of the free portion of the insulating layer will generally lie in the range 0.031 to 0.125 inches. The width of the folded portion of the conducting foil layer is sufficient merely to obtain structural stability that is the fold remains in place to ensure proper contact with the underside of the foil when wrapped around the cable. In such cases the width of the folded portion will lie generally in the range 0.031 to 0.125 inches.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tape consisting of a single conducting layer and a single insulating layer, said conducting layer being laminated to one side of said insulating layer with one longitudinal edge of the conducting layer being spaced inwardly from the respective longitudinal edge of the insulating layer to form an edge portion of the insulating layer which is free from said conducting layer, and the other longitudinal edge of the conducting layer overhanging the respective edge of the insulating layer being folded therearound and bonded to the other side of the insulating layer.

2. The invention according to claim 1 wherein the thickness of the conducting layer is in the range of 0.00025 to 0.004 inches.

3. The invention according to claim 1 wherein the thickness of the insulating layer is in the range of 0.00048 to 0.003 inches.

4. The invention according to claim 1 wherein the width of the tape is in the range of 0.25 to 2.0 inches.

5. The invention according to claim 1 wherein the free portion of the insulating layer has a width less than 0.125 inches.

6. The invention according to claim 1 wherein the folded portion of the conducting layer has a width less than 0.125 inches.

7. A cable comprising a pair of longitudinal continuous conductors each being insulated by a surrounding layer of an insulating material and each being adapted to transmit high frequency low power signals, and a shielding tape wrapped around the pair of conductors, said shielding tape consisting of a single conducting layer and a single insulating layer, aid conducting layer being laminated to one side of said insulating layer with one longitudinal edge of the conducting layer being spaced inwardly from the respective longitudinal edge of the insulating layer to form an edge portion of the insulating layer which is free from said conducting layer, and the other longitudinal edge of the conducting layer overhanging the respective edge of the insulating layer being folded therearound and bonded to the other side of the insulating layer, said tape being wrapped around said pair with said insulating layer outermost such that the edge thereof which is free from foil conducting layer is wrapped outermost and with said one longitudinal edge of the conducting layer being in an overlapping relationship with said other longitudinal edge of the conducting layer to provide continuous perimetrical electrical continuity.

8. A method of manufacturing a tape comprising slitting a web of a metallic foil material into a plurality of tapes each consisting only of a layer of said metallic foil, laminating to each slit foil tape a layer of a plastic insulating material such that one longitudinal edge of the slit foil tape is spaced inwardly from the respective longitudinal edge of the insulating layer to form an edge portion of the insulating layer which is free from said foil, and such that the other longitudinal edge of the metallic foil tape overhangs the respective other edge of the insulating layer, folding the overhanging edge of the foil tape around the edge of the insulating layer, bonding the overhanging edge of the foil tape to an opposed side of the insulating layer, and winding each of the tapes into a package of the tape.

* * * * *